(12) United States Patent
Kim et al.

(10) Patent No.: US 7,513,760 B2
(45) Date of Patent: Apr. 7, 2009

(54) OIL PUMP OF SCROLL COMPRESSOR

(75) Inventors: Seung Yup Kim, Suwon-si (KR); Myung Kyun Kim, Bucheon-si (KR); Byeong Chul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 11/422,149

(22) Filed: Jun. 5, 2006

(65) Prior Publication Data
US 2007/0122303 A1 May 31, 2007

(30) Foreign Application Priority Data
Nov. 30, 2005 (KR) ................ 10-2005-0115290

(51) Int. Cl.
*F03C 2/00* (2006.01)
*F04C 4/00* (2006.01)

(52) U.S. Cl. ............... 418/88; 418/94; 418/55.6; 418/171; 418/76; 418/77

(58) Field of Classification Search .......... 418/55–55.6, 418/88, 94, 166, 171, 75–77, 57; 184/6.16–6.18
See application file for complete search history.

(56) References Cited

U.S. PATENT DOCUMENTS

| | | | | |
|---|---|---|---|---|
| 3,743,453 A | * | 7/1973 | Abendschein et al. | 418/88 |
| 4,767,296 A | * | 8/1988 | Satomoto et al. | 418/171 |
| 5,413,470 A | * | 5/1995 | Eisenmann | 418/171 |
| 5,755,565 A | * | 5/1998 | Koyama et al. | 418/170 |
| 5,810,573 A | * | 9/1998 | Mitsunaga et al. | 418/55.6 |
| 2005/0019196 A1 | * | 1/2005 | Enzaka et al. | 418/171 |
| 2005/0034926 A1 | | 2/2005 | Kim et al. | |

FOREIGN PATENT DOCUMENTS

JP 06147177 A * 5/1994 ................ 418/88

* cited by examiner

*Primary Examiner*—Theresa Trieu
(74) *Attorney, Agent, or Firm*—Greenblum & Bernstein, P.L.C.

(57) ABSTRACT

An oil pump of a scroll compressor is provided. The oil pump includes a pump body to which a drive shaft is inserted; a gear unit inserted to a lower side of the pump body and rotating by the rotation of the drive shaft; and a pump cover coupled to a lower side of the pump body and including an inlet through which oil is introduced, an outlet through which the introduced oil is discharged to the drive shalt, and one or more noise reducing portions reducing noise generated during a pumping process.

19 Claims, 8 Drawing Sheets

OIL PUMP OF SCROLL COMPRESSOR

BACKGROUND OF THE INVENTION

1. Field of the Invention

The present invention relates to a scroll compressor, and more particularly, to an oil pump of a scroll compressor capable of lubricating a friction portion by supplying oil thereto. More particularly, the present invention relates to an oil pump of a scroll compressor capable of reducing a noise generated during an oil pumping process when a compressor operates at a high rate.

2. Description of the Related Art

In general, a compressor is an apparatus converting mechanical energy into a compressive force, and is categorized into a reciprocating type, a scroll type, a centrifugal type and a vane type. Particularly, the scroll compressor is commonly used in an air conditioner and a freezer.

Also, the scroll compressor is divided into a low-pressure type scroll compressor or a high-pressure type scroll compressor according to whether a casing of the scroll compressed is filled with a suction gas or a discharge gas.

The conventional low-pressure type scroll compressor includes a casing, a drive motor provided inside the casing and including a rotor and a stator, a drive shaft rotated by the rotation of the drive motor, having an eccentric portion at its upper portion and having an oil supply path therein, an upper frame inserted on an upper portion of the drive shaft, and an intake pipe through which a fluid is introduced from the outside.

Also, the scroll compressor includes a scroll compression unit and a discharge pipe through which a refrigerant compressed in the scroll compression unit is discharged to the outside. Here, the scroll compression unit includes an orbiting scroll placed on the upper frame and compressing a refrigerant introduced through the intake pip by an orbiting movement, and a fixed scroll interlocked with the orbiting scroll and fixed on the upper frame.

Also, an oil pump is provided to pump up to the oil supply path, oil stored in an oil storage placed at a lower side of the compressor.

The operation of the scroll compressor configured in such a manner will now be briefly described.

First, when a low pressure refrigerant having passed through an expansion process is introduced through the intake pipe, a portion of the introduced refrigerant lows to the scroll compression unit and the other portion thereof flows to and is stored in the oil storage.

Also, during a compression process, the refrigerant and oil stored in the oil storage are pumped up by the oil pump and flow up to an upper end of the drive shaft along the oil supply path. Then, the oil is ejected to an upper portion of the eccentric portion to be supplied to a friction portion for lubrication.

However, in the convention oil pump, when a compressor operates at a high rate to increase the amount of oil supplied to the friction portion, severe noise occurs due to the friction between components of the oil pump and the great flow pressure of a fluid flowing inside the oil pump.

Also, because such noise largely occupies the entire noise generated from the scroll compressor, the noise generated from the compressor becomes a big issue.

SUMMARY OF THE INVENTION

An object of the present invention is to provide an oil pump of a scroll compressor capable of minimizing a noise generated from an oil pump when the compressor operates at a high rate.

Another object of the present invention is to provide an oil pump of a scroll compressor capable of reducing a noise in a simple manner without a big change in an existing structure.

A further another object of the present invention is to provide an oil pump of a scroll compressor capable of remarkably reducing the entire noise generated from the compressor by minimizing a noise generated from the oil pump.

In an aspect of the present invention, there is provided an oil pump of a scroll compressor, including: a pump body to which a drive shaft is inserted; a gear unit inserted to a lower side of the pump body and rotating by the rotation of the drive shaft; and a pump cover coupled to a lower side of the pump body and including an inlet through which oil is introduced, an outlet through which the introduced oil is discharged to the drive shaft, and one or more noise reducing portions reducing noise generated during a pumping process.

In another aspect of the present invention, there is provided an oil pump of a scroll compressor, including: a pump body coupled to the drive shaft; a gear inserted to a lower side of the pump body and rotated by the rotation of the drive shaft; and a pump cover coupled to a lower side of the pump body and including an inlet through which oil is introduced, an outlet formed at the opposite side of the inlet, a drive shaft insertion groove formed between the inlet and the outlet, and one or more noise reducing portions formed at the outlet side and reducing noise generated during a pumping process.

In a further another aspect of the present invention, there is provided an oil pump of a scroll compressor, including: a pump body to which a drive shaft is inserted; a gear unit inserted to a lower side of the pump body and rotated by the rotation of the drive shaft; a pump cover coupled to a lower side of the pump body and including an inlet through which oil is introduced, and an outlet formed at the opposite side of the inlet; and one or more noise reducing portions reducing noise generated during an oil pumping process, each including a noise reducing groove formed outward from the outlet at a predetermined length and a noise reducing chamber recessed downward from an upper surface of the puma cover.

By the present invention, a noise generated from the oil pump is minimized when the compressor operates at a high rate.

Also, a noise of a specific frequency bandwidth can be reduced according to the sizes of the noise reducing groove and the nose reducing chamber formed at the pump cover. Therefore, changing the shapes of the noise reducing groove and the noise reducing chamber may allow reduction of noises of various frequency bandwidths.

In addition, the reducing of the noise generated from the oil pump contributes to reducing noises generated from the compressor on the whole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
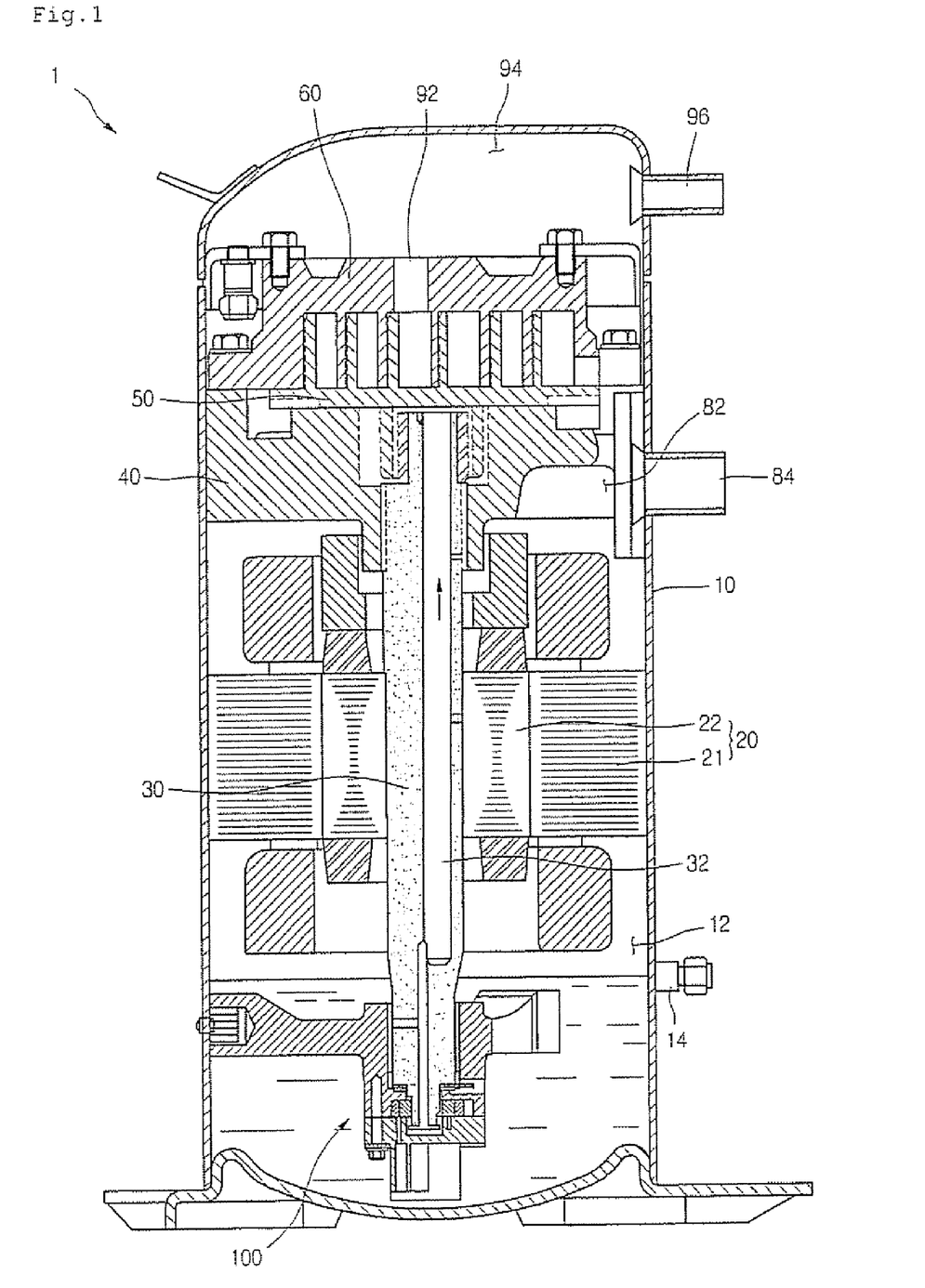
FIG. 1 is a cross-sectional view of a scroll compressor according to the present invention.

FIG. 1 is a cross-sectional view or a scroll compressor according to the present invention.

Referring to FIG. 1, a scroll compressor 1 according to the present invention includes a casing 10, a drive unit generating a rotary force, an intake unit introducing a fluid from the outside, a scroll compression unit compressing a fluid introduced therein from the intake unit, a discharge unit In detail, the drive unit includes a drive motor 20 including a stator 21 fixed inside the casing 10 and a rotor 22 placed inside the stator 21, and a drive shaft 30 rotating, inserted in the center of the drive motor 20.

Also, the intake unit includes an intake pipe 84 formed at one side of an outer circumferential surface of the casing 10, and an intake chamber 82 communicating with the intake pipe 84 and in which an introduced refrigerant is accumulated.

Also, the scroll compressor includes an upper frame 40 inserted on an upper portion or the drive shaft 30 and supporting the drive shaft 30, an orbiting scroll 50 provided on the upper frame 40 and compressing a refrigerant introduced through the intake pipe 84, and a fixed scroll 60 interlocked with the orbiting scroll 50 and fixed on the upper frame 40.

Also, the discharge unit includes a discharge port 92 formed at the center of the fixed scroll 60 and allowing discharge of the compressed refrigerant and oil, a discharge chamber 94 communicating with the discharge port 92 and formed at an upper side of the casing 10, and a discharge pipe 96 formed at one side of the discharge chamber 94.

Also, the oil pump 100 is provided at a lower side inside the casing 10 and connected with the drive shaft 30. Also, the oil pump 100 is configured to pump up the oil stored in the oil storage 12 by the rotation of the drive shaft 30.

The operation of the scroll compressor 1 will now be described

First, when the scroll compressor 1 is driven, a refrigerant is taken in through the intake pipe 84. Then, a portion of the introduced refrigerant flows into the scroll compression unit via the intake chamber 82, and another portion of the refrigerant flows to and is stored in the oil storage 12.

Also, the refrigerant having flown to the scroll compression unit is compressed to a high pressure by orbiting of the orbiting scroll 50, and the compressed refrigerant gathers together toward the center of the scroll compressor unit. The high pressure refrigerant having gathered together flows to the discharge chamber 94 through the discharge port 92. Finally, the refrigerant accumulated in the discharge chamber 94 is discharged to the outside of the scroll compressor 1 through the discharge During the compression or the refrigerant, the oil stored in the oil storage 12 is pumped up by the oil pump 100 operated by the rotation of the drive shaft 30. The pumped oil flows up along the inside of the drive shaft 30 and thus is supplied to a friction portion.

The structure of the oil pump 100 according to the present invention will now be described in detail.

Figure 2:
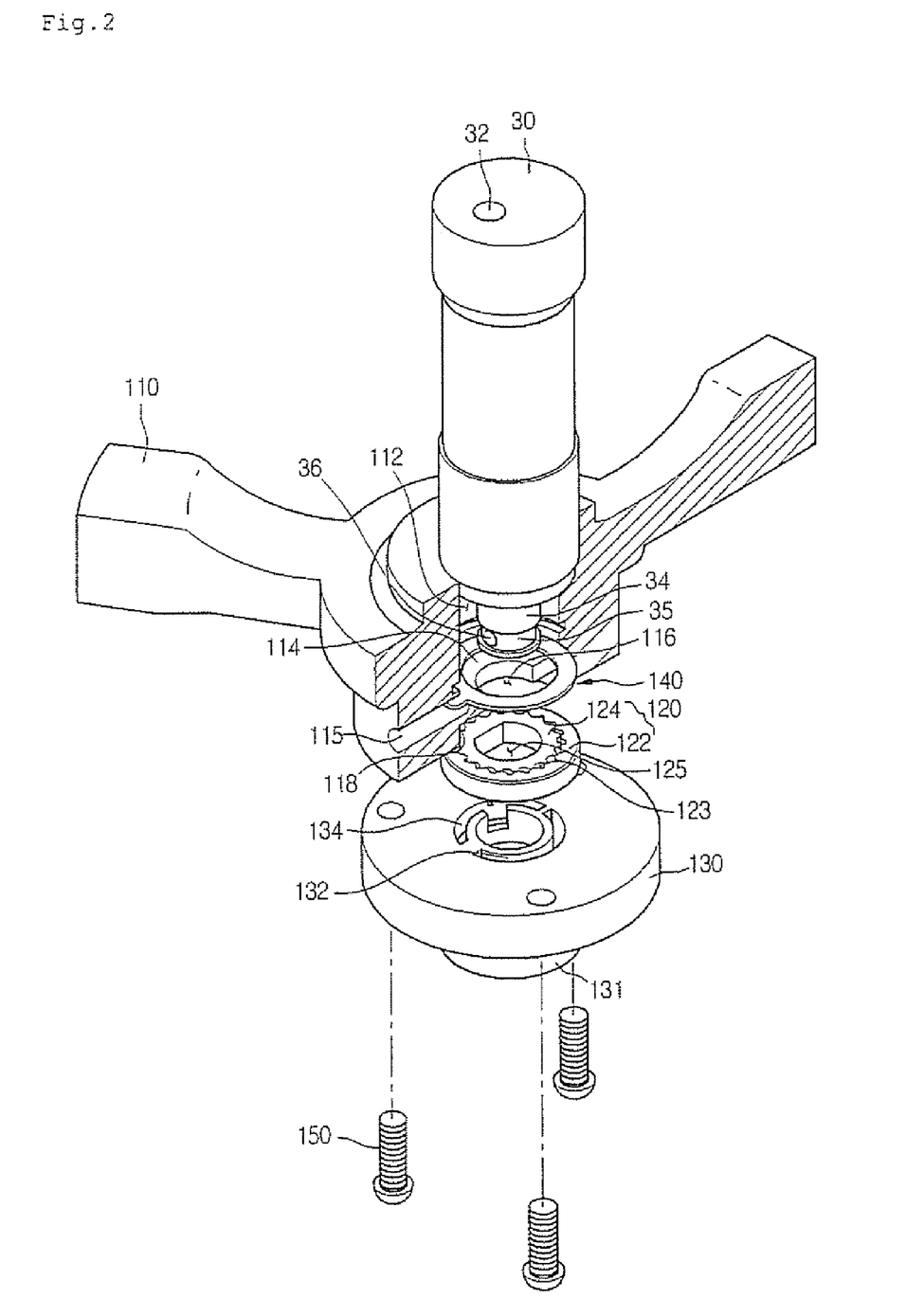
FIG. 2 is an exploded perspective view of an oil pump according to the present invention.

FIG. 2 is an exploded perspective view of an oil pump according to the present invention.

Referring to FIG. 2, the oil pump 100 according to the present invention includes a pump body 110 having a central portion to which the drive shaft 30 is penetratingly inserted, a gear unit 120 inserted to a lower side of the pump body 110 and rotated by the rotation of drive shaft 30, and a pump cover 130 coupled to a lower side of the pump body 110.

In detail, the drive shaft 30 has a predetermined diameter and length, and has an oil flow path functioning as a flow passage of the pumped oil. The oil flow path includes a horizontal flow path 36, and a vertical flow path 32 communicating with the horizontal flow path 36 and formed in a vertical direction.

A gear driver 34 is formed at a lower side of the drive shaft 30 and is coupled to the gear unit 120 to allow the rotation of the gear unit 120.

The gear driver 34 has a guide groove 35 allowing smooth inflow of the oil around its outer circumferential surface. Here, the horizontal flow path 36 is formed on the guide groove 35. Accordingly, after introduced in the horizontal direction along the horizontal flow path 36, the oil flows up along the vertical flow path 32 in a vertical direction.

The pump body 110 includes a drive shaft insertion groove 112 recessed in an upper side of the pump body 110 at a predetermined depth. Here, the drive shaft 30 is inserted in the drive shaft insertion groove 112. Also, the drive shaft insertion groove 112 includes at its lower surface, a plate receiving portion 114 receiving a friction reducing plate 140.

Here, the friction reducing plate 140 serves to reduce friction between the drive shaft 30 and the pump body 110 at the time of rotation of the drive shaft 30.

Also, a drive through hole 11 through which the gear driver 34 penetrates is formed on a lower surface of the drive shat insertion groove 12. The pump body 110 includes a gear insertion groove 118 recessed upward in a lower surface of the pump body 110 and to which the gear unit 120 is inserted.

The gear unit 120 includes an inner gear 124 having gear teeth around its outer circumferential surface, and an outer gear 122 having gear teeth around its inner circumferential surface. The inner gear 124 includes a drive coupling hole 125 coupled to the gear driver 34.

Here, an outer diameter of the inner gear 124 is smaller than an inner diameter of the outer gear 122. Namely, when the inner gear 124 is coupled to the outer gear 122, the gear teeth of the inner gear 124 are not completely engaged with the gear teeth of the outer gear 122, thereby forming a plurality of chambers 123 accommodating oil.

Accordingly, when pumped, the oil is introduced into the chambers 123 and the introduced oil flows by the rotation of the gear unit 120.

The pump cover 130 is coupled to a lower side of the pump body 110 by a coupling member 150. Also, the pump cover 130 includes an inlet 132 through which oil stored in the oil storage 12 introduced, and an outlet 134 through which the oil pumped by the gear unit 120 is discharged. The detailed description on the pump cover 130 will be described with reference to the accompanying drawing.

Figure 3:
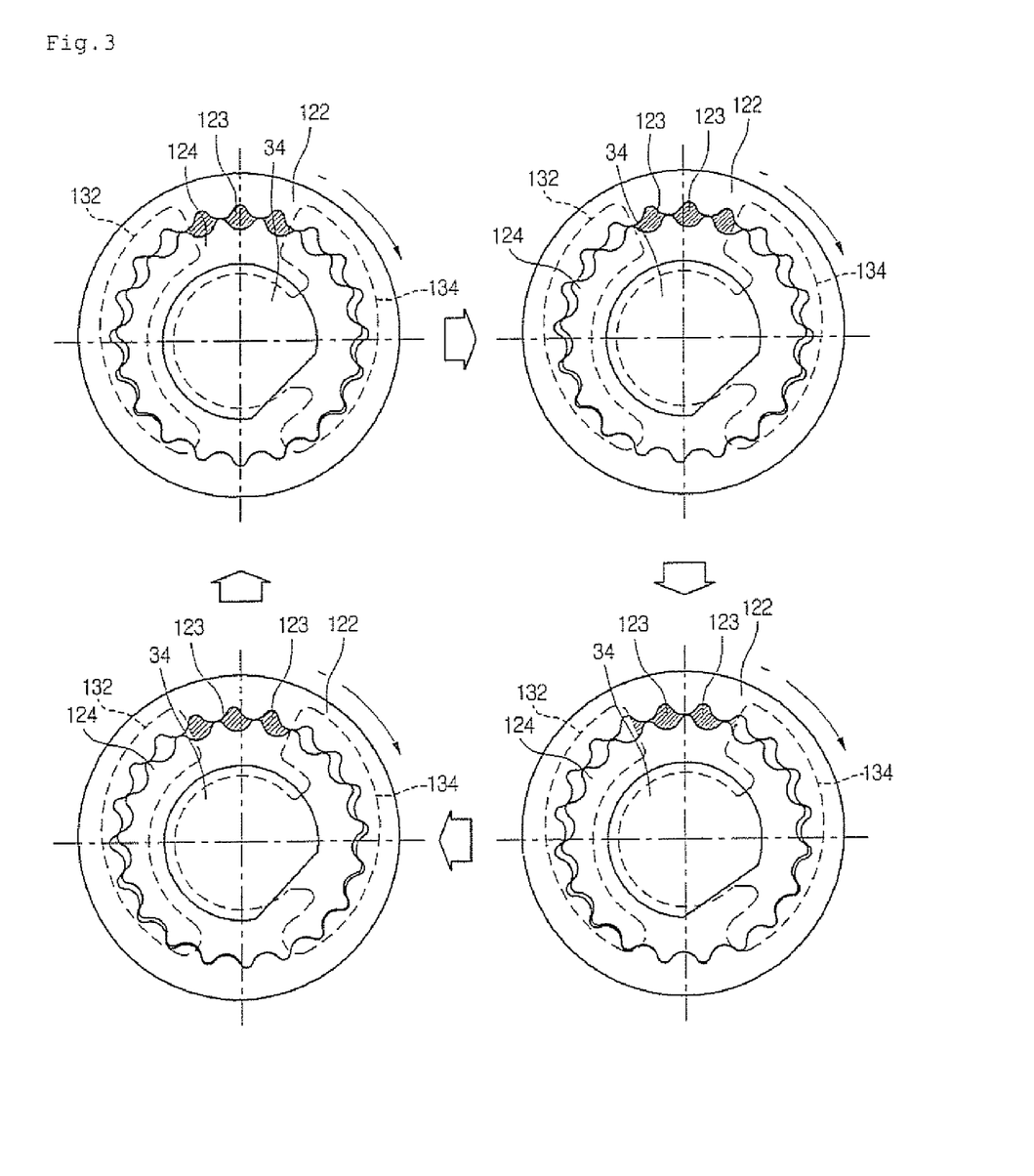
FIG. 3 is a plan view illustrating a process of pumping oil in a gear unit

FIG. 3 is a plan view illustrating a process of pumping oil in the gear unit according to the present invention.

Referring to FIG. 3, when the drive motor 20 rotates the drive shaft 30, the gear unit 120 is rotated by the rotation of the drive shaft 30. Then, oil stored in the oil storage 12 is introduced into the chambers 123 through the inlet 132 of the pump cover 130.

In detail, when the drive shaft 30 is rotated, the inner gear 124 coupled to the gear driver 34 is rotated together with the gear driver 34. The gear teeth of the inner gear 124 are rotated on the gear teeth of the outer gear 122, and such rotation of the inner gear 124 makes the outer gear 122 rotate.

The oil introduced to the chamber 123 as the inner gear 124 and the outer gear 122 are rotated together, flows toward the outlet 134 of the pump cover 130. When the flowing oil meets the outlet 132, the oil drops through the outlet 132. The dropping oil flows into the horizontal path 36. Then, the oil having flowed into the horizontal path 36 flows up along the vertical path 32.

The structure of the pump cover 130 will now be described in detail.

Figure 4:
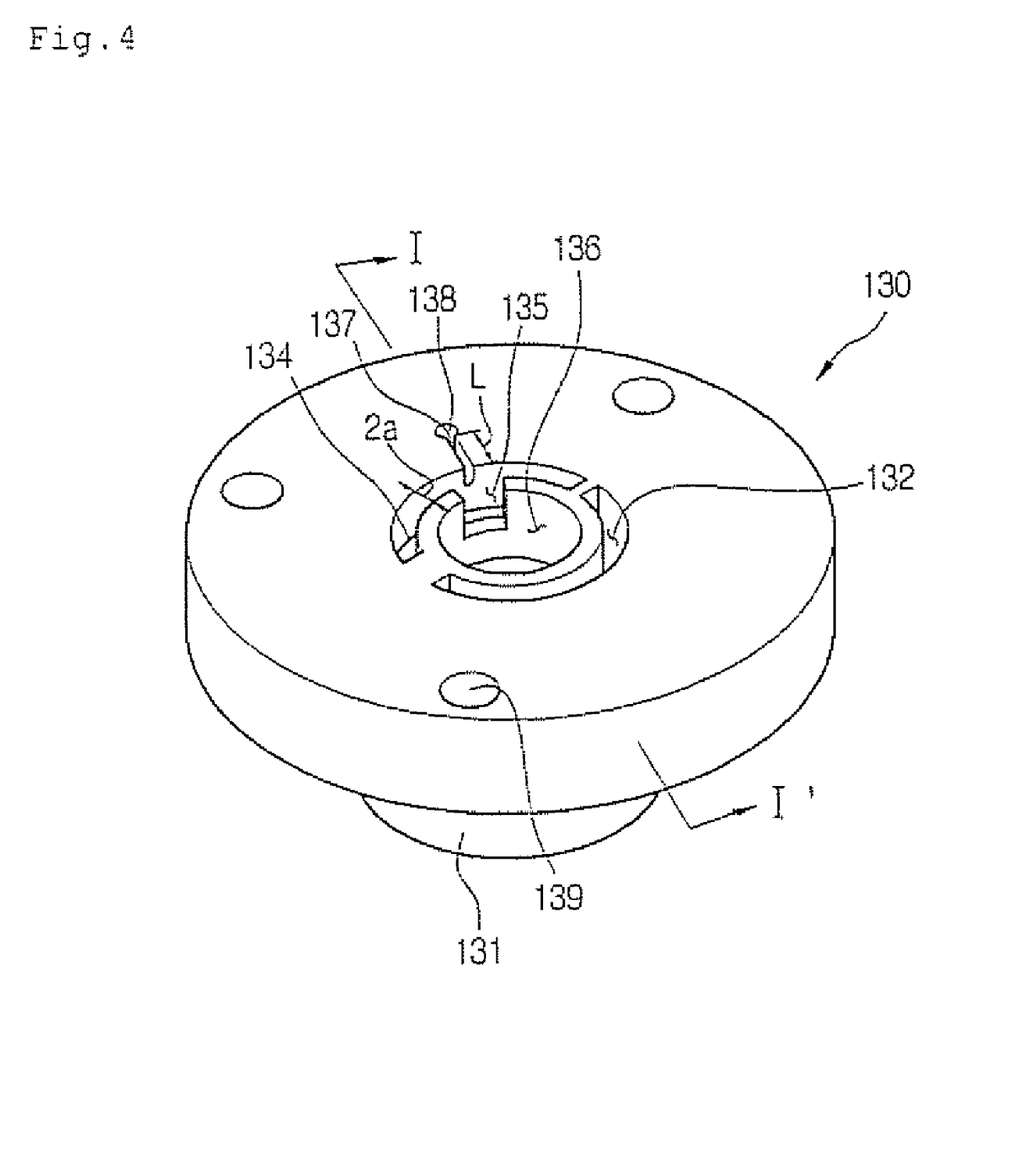
FIG. 4 is a perspective view of a pump cover according to the present invention.
Figure 5:
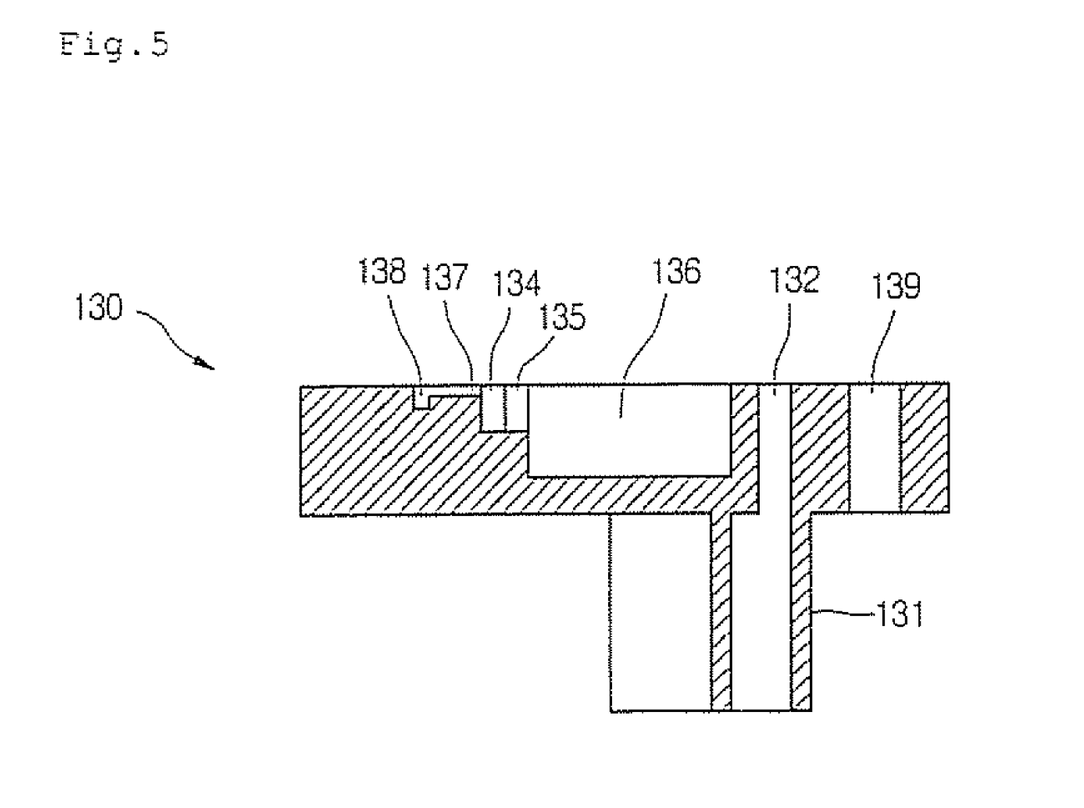
FIG. 5 is a cross-sectional view taken along line I-I' of FIG. 4.

FIG. 4 is a perspective view of a pump cover according to the present invention, and FIG. 5 is a cross-sectional view taken along line I-I' of FIG. 4.

Referring to FIGS. 4 and 5, the pump cover 130 according to the present invention is coupled to a lower side of the pump body 110 by a coupling member 150. A plurality of coupling holes 139 are formed on the pump cover 130 and are coupled to the coupling members 150. Here, the intervals between the coupling holes 139 are different so that the pump cover 130 can be coupled to the pump body 110 with the directionality.

An intake portion 131 allowing introduction of the oil stored in the oil storage 12 protrudes downward from a lower side of the pump cover 130. Also, the intake portion 131 is formed to be round as a rough semicircle, and has therein an inlet 132 allowing the flow of the oil.

Also, an outlet 134 is recessed at a portion corresponding to the inlet 132 at a certain depth. Through the outlet 134 the oil introduced to the gear unit 120 through the inlet 132 is discharged.

The outlet 134 includes an outlet groove 135 allowing the oil discharged through the outlet 134 to be introduced to the horizontal flow path 36. An drive insertion groove 136 in which the gear driver 34 is inserted is formed between the inlet 132 and the outlet 134.

When the horizontal flow path 36 communicates with the outlet groove 135 during the rotation of the gear driver 34, the oil within the outlet 134 flows into the horizontal flow path 36.

At least one noise reducing portion is formed at the pump cover 130 in order to reduce noise generated during the oil pumping process.

In detail, the noise reducing portion includes a noise reducing groove 137 formed outward from an upper side of the outlet 134 and having a predetermined depth and length, and a noise reducing chamber 138 communicating with the noise reducing groove 137 and recessed downward from an upper surface of the pump cover 130 at a predetermined depth. The noise reducing groove 137 has a semicircular or a quadrangular section.

That is, the noise reducing groove 137 and the noise reducing chamber 138 form a resonator.

In more details during the oil pumping process, a specific stationary wave induced into the noise reducing chamber 138 through the noise reducing groove 137 is converted into out of phase vibration and then comes out of the outlet 134. Also, phase shifting occurs with respect to the specific stationary wave, thereby destroying the specific stationary wave within the outlet 134A.

Also, in order to decrease a noise having the specific stationary wave, the noise reducing groove 137 and the noise reducing chamber 138 are formed to satisfy the following equation.

$$\omega = c \cdot \sqrt{\frac{S}{(L+1.5a) \cdot V}} \qquad \{\text{Equation 1}\}$$

where ω denotes the number of vibrations, c denotes the wave speed, S denotes the sectional area of an entrance or the noise reducing groove, L denotes the length of the noise reducing groove, a denotes the diameter of a flow path of the outlet, and V denotes the volume of the noise reducing chamber.

Accordingly, the noise reducing groove 137 and the noise reducing chamber 138 satisfying the equation 1 are formed, so that the noise having the specific stationary wave can be reduced.

Also, changing the sizes of the noise reducing groove 137 and the noise reducing chamber 138 may allow noises of different frequency bandwidths to be reduced. Thus, controlling the number or noise reducing grooves 137 and the noise reducing chambers 138 allow the reduction of noises of various frequency bandwidths.

Figure 6:
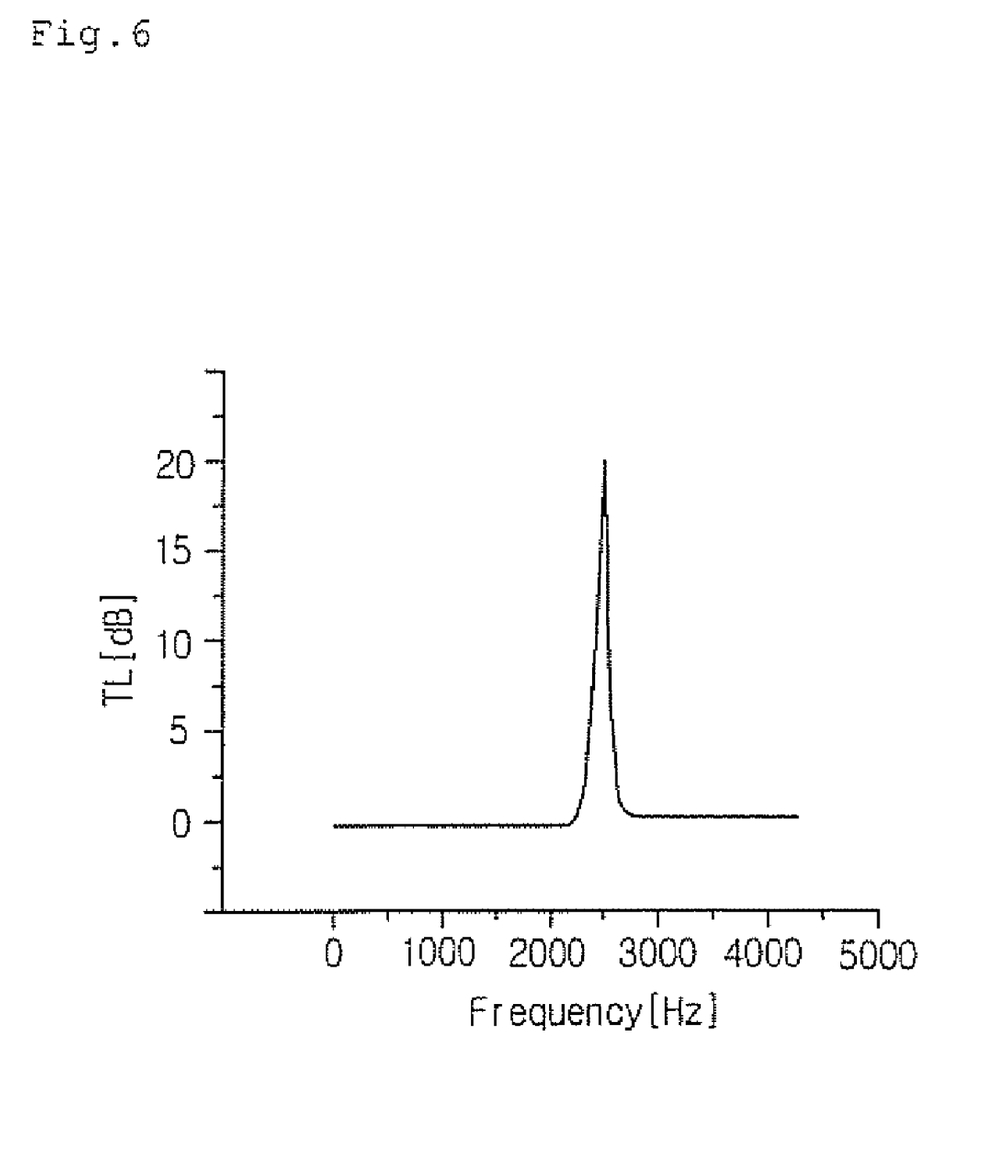
FIG. 6 is a experiment graph illustrating the effect of the present invention.

FIG. 6 is an experiment graph for illustrating the effects of the present invention.

Here, the frequency is on the x-axis of the graph, and the TL (transmission Loss) is on the v-axis. In general, as the TL has a greater value, the noise is generated less in FIG. 6, the noise reduction effect is illustrated when the noise reducing groove 137 and the noise reducing chamber 138 are tuned to about 2.5 KHz bandwidth.

As for the result of the experiment of FIG. 6, the TL was about 20 db when frequency was about 2.5 KHz bandwidth. Therefore, it can be seen that the noise reducing groove 137 and the noise reducing chamber 138 reduce a noise having frequency of about 2.5 KHz bandwidth.

Accordingly, the forming of the noise reducing groove 137 and the noise reducing chamber 138 at the pump cover 130 is like forming a resonator. For this reason, the specific frequency bandwidth noise can be desirably reduced.

Here, even though the present experiment shows that a noise is reduced when the frequency bandwidth is about 2.5 KHz, the noise reducing groove and the noise reducing chamber may be varied in shape, corresponding to a noise frequency bandwidth that is intended to be reduced, so that a specific frequency bandwidth noise can be reduced.

Figure 7:
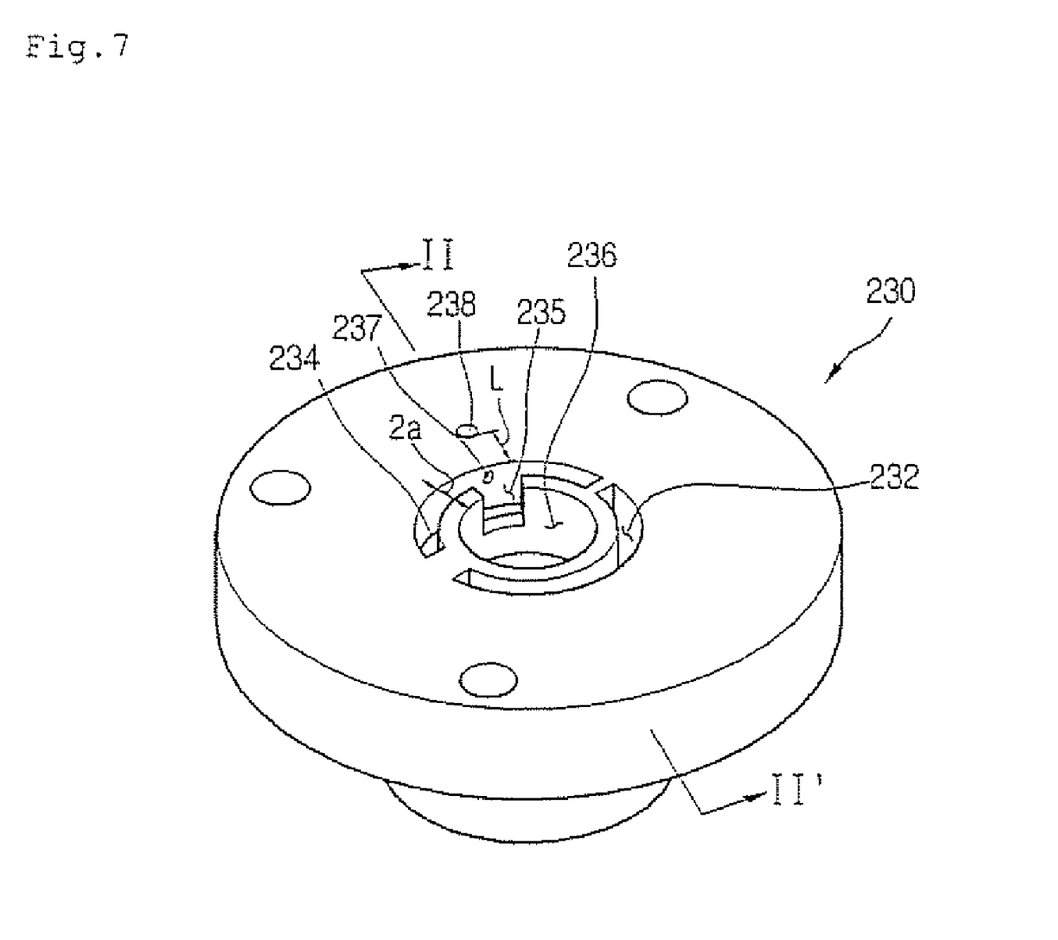
FIG. 7 is a perspective view or a pump cover according to another embodiment of the present invention.
Figure 8:
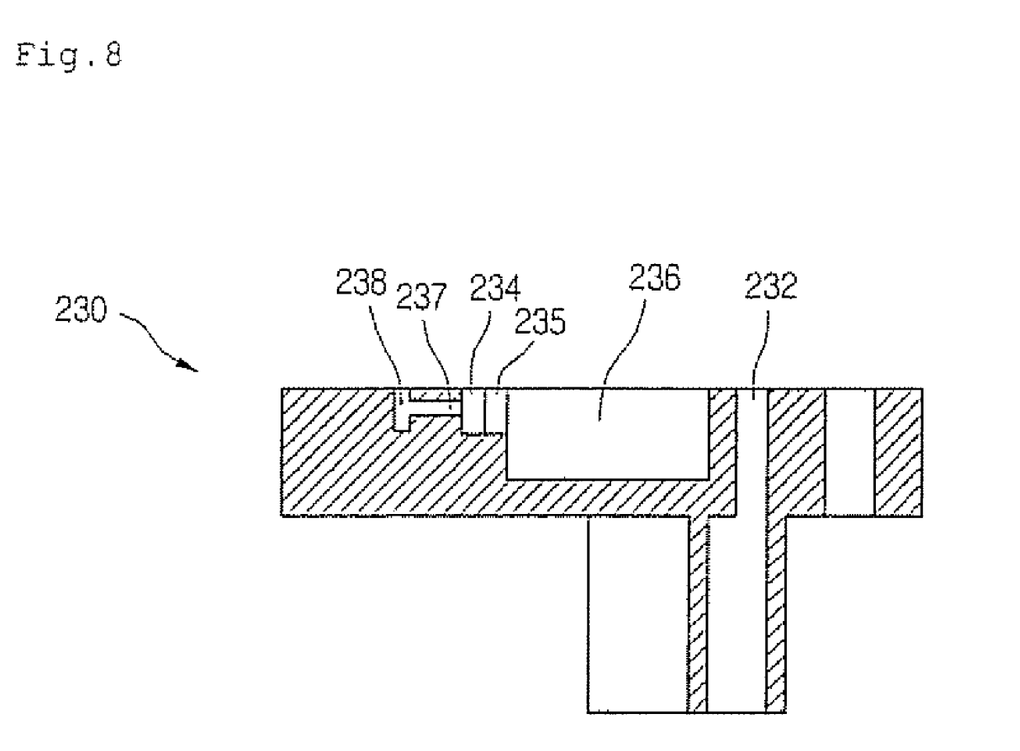
FIG. 8 is a cross-sectional view taken along line II-II' of FIG. 7.

FIG. 7 is a perspective view of a pump cover according to another embodiment of the present invention, and FIG. 8 is a cross-sectional view taken along line II-II' of FIG. 7.

The pump cover according to another embodiment of the present invention is identical to one embodiment, except for a position where the noise reducing groove is formed.

Referring to FIGS. 7 and 8, the noise reducing portion according to the present invention includes a noise reducing groove 237 recessed outward from a side surface of the outlet 234 at a predetermined depth and length, and a noise reducing chamber 238 recessed downward from an upper surface of the pump cover 230 and communicating with the noise reducing groove 237. Namely, the noise reducing groove 237 is formed as a tunnel shape.

In the case of one embodiment, when the pump cover is coupled to the pump body, the upper side of the noise reducing groove 137 is shielded by the pump body 110. Thus, because of a gap between the pump cover 130 and the pump body 110, the specific stationary wave cannot effectively come into the noise reducing chamber 138.

Therefore, in the present embodiment, the noise reducing groove 237 is formed at the side surface of the outlet 23A, thereby preventing the formation of the gap. Accordingly, the specific stationary wave can effectively come into the noise reducing chamber 238, thereby improving the noise reducing effect.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An oil pump for a scroll compressor, the oil pump comprising:
   a pump body configured to receive a drive shaft therein;
   a gear unit positioned at one side of the pump body, the drive shaft being configured to rotate the gear unit; and
   a pump cover coupled to the one side of the pump body, wherein the pump cover comprises:
   an inlet through which oil is introduced, an outlet through which the introduced oil is discharged to the drive shaft, and at least one noise reducer communicating with the outlet so as to reduce noise generated during a pumping process, wherein the outlet is positioned radially inward of the noise reducer.

2. The oil pump according to claim 1, wherein the noise reducer is formed on the periphery of the outlet.

3. The oil pump according to claim 1, wherein the noise reducer comprises:
   a noise reducing groove formed at an upper surface of the pump cover and having a predetermined length; and
   a noise reducing chamber provided at an end portion of the noise reducing groove and having a predetermined depth that is greater than a depth of the noise reducing groove.

4. The oil pump according to claim 1, wherein the noise reducer comprises:
   a noise reducing groove extending outwardly from a side surface of the outlet and having a predetermined length; and
   a noise reducing chamber comprising a recess provided at an upper surface of the pump cover, the noise reducing chamber communicating with the noise reducing groove.

5. The oil pump according to claim 1, wherein the at least one noise reducer comprises a plurality of noise reducers having different sizes.

6. The oil pump according to claim 1, wherein the at least one noise reducer comprises a plurality of reducers which reduce noises of different frequency bandwidths.

7. An oil pump for a scroll compressor, the oil pump comprising:
   a pump body coupled to a drive shaft;
   a gear unit positioned at one side of the pump body, the drive shaft being configured to rotate the gear unit; and
   a pump cover coupled to the one side of the pump body, wherein the pump cover comprises:
   an inlet through which oil is introduced, an outlet formed at the opposite side of the inlet, a drive shaft insertion groove formed between the inlet and the outlet, and at least one noise reducer formed at the outlet side and communicating with the outlet, the noise reducer reducing noise generated during a pumping process, and wherein the outlet is positioned radially inward of the noise reducer.

8. The oil pump according to claim 7, wherein the noise reducer comprises:
   a noise reducing groove extending outwardly from the outlet and having a predetermined length; and
   a noise reducing chamber comprising a recess provided at an upper surface of the pump cover, the noise reducing chamber communicating with the noise reducing groove.

9. The oil pump according to claim 8, wherein the noise reducing groove is formed at an upper surface of the pump cover.

10. The oil pump according to claim 8, wherein the noise reducing groove has a tunnel shape.

11. The oil pump according to claim 8, wherein the noise reducing groove and the noise reducing chamber are formed to satisfy the following equation:

$$\omega = c \cdot \sqrt{\frac{S}{(L+1.5a) \cdot V}}$$

where $\omega$ defines the number of vibrations,
   c defines the wave speed,
   S defines the sectional area of an entrance of the noise reducing groove,
   L defines the length of the noise reducing groove,
   a defines the diameter of a flow path of the outlet, and
   V defines the volume of the noise reducing chamber.

12. The oil pump according to claim 7, wherein the at least one noise reducer comprises a plurality of noise reducers, the plurality of noise reducers having different sizes.

13. The oil pump according to claim 7, wherein the at least one noise reducer is a plurality of noise reducers which reduce noises of different frequency bandwidths.

14. An oil pump for a scroll compressor, the oil pump comprising:
   a pump body insertably receiving a drive shaft;
   a gear unit positioned at one side of the pump body, the drive shaft being configured to rotate the gear unit;
   a pump cover coupled to the one side of the pump body, the pump cover comprises: an inlet through which oil is introduced, and an outlet formed at an opposite side of the inlet; and
   at least one noise reducer communicating with the outlet so as to reduce noise generated during an oil pumping process, each noise reducer including a noise reducing groove extending outwardly from the outlet and having a predetermined length and a noise reducing chamber comprising a recess provided at an upper surface of the pump cover, and wherein the outlet is positioned radially inward of the noise reducer.

15. The oil pump according to claim 14, wherein the noise reducing groove is formed at an upper surface of the pump cover.

16. The oil pump according to claim 14, wherein the noise reducing groove is formed to extend outwardly from a side surface of the outlet and has a tunnel shape.

17. The oil pump according to claim 14, wherein the noise reducer comprises a plurality of noise reducers formed to have different-sized noise reducing grooves and noise reducing chambers.

18. The oil pump according to claim 14, wherein the noise reducing groove and the noise reducing chambers are formed to satisfy the following equation:

$$\omega = c \cdot \sqrt{\frac{S}{(L+1.5a) \cdot V}}$$

where $\omega$ defines the number of vibrations,
c defines the wave speed,
S defines the sectional area of an entrance of the noise reducing groove,
L defines the length of the noise reducing groove,
a defines the diameter of a flow path of the outlet, and
V defines the volume of the noise reducing chamber.

19. The oil pump according to claim 14, wherein the at least one noise reducer comprises a plurality of noise reducers which reduce noises of different frequency bandwidths.

* * * * *